UNITED STATES PATENT OFFICE.

L. OTTO P. MEYER, OF NEWTOWN, CONNECTICUT.

IMPROVEMENT IN SOFT VULCANIZED INDIA-RUBBER WITH GLOSSY SURFACE.

Specification forming part of Letters Patent No. 153,448, dated July 28, 1874; application filed April 25, 1874.

CASE B.

*To all whom it may concern:*

Be it known that I, L. OTTO P. MEYER, of Newtown, county of Fairfield and State of Connecticut, have invented a new manufacture of Vulcanized, Soft, Elastic, and Compressible India-Rubber, with a Glossy Surface, of which the following is a specification:

Prior to my said invention, articles of vulcanized india-rubber, of what is known as the soft, pliable, and compressible compound, as distinguished from hard rubber or vulcanite, were never produced with a glossy surface of the same substance as the inside. The gloss on the surface could only be produced either by linseed-oil varnish applied to the surface before, or by painting or varnishing the surface after vulcanization; but the new manufacture which I have produced has a fine glossy surface, similar to what is known as hard rubber or vulcanite, the gloss on the surface being produced as in vulcanite of the same material as the body; but my new manufacture is distinguished from vulcanite in being of the same or similar texture as what is known as soft, pliable, and compressible vulcanized rubber.

My said manufacture resembles the soft, pliable, and compressible vulcanized rubber in texture, softness, pliability, and compressibility, and is distinguished from this in having a glossy surface, either black or of other fine color, not produced by painting or varnishing the surface before or after vulcanization.

Articles of the said new manufacture can be produced of any shape desired, and with the surfaces plain or ornamental, and can be made with cloth on one surface, or with cloth in the inside, as may be desired.

What is known as good proportion of india-rubber and sulphur, for producing common soft rubber, can be employed for my new manufacture. A compound containing one hundred and sixty-five parts of india-rubber and eight parts of sulphur, by weight, produces a very soft rubber; but it is well understood that the proportions of sulphur may be varied, and I have obtained good results by employing sulphur in various proportions for my new manufacture.

For producing my new manufacture in very fine colors, I employ what is known as steam vulcanizable zinc compound, consisting of india-rubber, sulphur, and zinc oxide, the latter about in proportions of one-half to one part for each part of india-rubber, by weight. The said zinc compound, if prepared by my new process, is of cream or drab color after vulcanization.

I have produced other very fine colors by adding to said zinc compound small quantities of one or more of the following pigments: Chrome-yellow, red iron oxide, vermilion, ultramarine, and indigo. Other adulterations, as usual in preparing compounds for common soft rubber, may be employed for my new manufacture.

The ingredients are to be mixed and calendered in the usual way of preparing hard rubber or vulcanite.

Whenever I employ cloth for the inside of my new manufacture, I prepare it previously by soaking in highly-heated lard-oil and thereupon squeezing it nearly dry by calender-rolls.

The smooth glossy surfaces of such manufacture I have successfully produced by the following process, which is made the subject of a separate application for Letters Patent. I will describe the manufacture in which I have successfully worked my said process, and which, for that reason, I prefer, although other processes may be invented to produce a like result. I prefer to use for the metallic sheets tin-foil of about one-hundredth part of an inch in thickness, although the same result in kind can be obtained with thicker sheets, and even with thick metallic plates or forms. The metallic sheets are placed on a platform heated somewhat above the melting-point of paraffine, and after the metallic surface has been properly cleaned, it is to be rubbed with a rag dipped in paraffine, and a little French chalk may be mixed with the paraffine before rubbing on; or the French chalk may be brushed over the coated metallic sheets, if the articles to be produced are intended to be of some light color. Lamp-black is to be taken instead of French chalk for black-colored articles. The metallic sheets so coated are laid aside to cool, and, previously to rolling them onto the compound in the green state, I prefer to rub a little lard-oil on the surface which is to be plated, and then the contact of the surfaces is effected by pressure of rollers, as heretofore practiced in covering the hard compound for the production of vulcanite.

Instead of applying French chalk or lamp-black to the coating of paraffine, it may be applied to the compound, or it may be entirely dispensed with, and so can the rubbing of the surface of the compound with lard-oil be dispensed with.

The plastic compounds, after being plated with tin-foil, may be shaped into various forms, or may be embossed by dies.

The known vulcanizing processes for producing vulcanite are suitable for vulcanizing the articles of soft-rubber compound prepared by my said new process.

The vulcanization in water, as usual for vulcanite, is preferred by me.

Dry heat without pressure cannot be employed for articles of my new manufacture, if prepared with metallic covering, or more than one surface.

After vulcanization, a heat near the boiling-point of water may be employed for facilitating the operation of stripping the metallic sheets from off the rubber.

What I claim as my invention, and desire to secure by Letters Patent, is—

The new manufacture, substantially such as described, and consisting of what is known as soft, pliable, and compressible vulcanized india-rubber, with glossy surface or surfaces of the same material as the body, as set forth, as distinguished from a gloss produced by the application of paint or varnish to the surface before or after vulcanization.

L. OTTO P. MEYER.

Witnesses:
HENRY SANFORD,
EDGAR F. HAWLEY.